(12) United States Patent
Box et al.

(10) Patent No.: US 7,882,120 B2
(45) Date of Patent: Feb. 1, 2011

(54) DATA DESCRIPTION LANGUAGE FOR RECORD BASED SYSTEMS

(75) Inventors: Donald F. Box, Bellevue, WA (US); Brian F. Chapman, Redmond, WA (US); Martin J. Gudgin, Sammamish, WA (US); Michael J. Hillberg, Beaux Arts, WA (US); Charles P. Jazdzewski, Redmond, WA (US); Natasha H. Jethanandani, Seattle, WA (US); Geoffrey M. Kizer, Seattle, WA (US); Robert A. Relyea, Bellevue, WA (US); Jeffrey C. Schlimmer, Redmond, WA (US); Joel West, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 12/013,658

(22) Filed: Jan. 14, 2008

(65) Prior Publication Data

US 2009/0182760 A1 Jul. 16, 2009

(51) Int. Cl.
*G06F 17/30* (2006.01)
(52) U.S. Cl. .................................... 707/758
(58) Field of Classification Search ............. None
See application file for complete search history.

(56) References Cited

U.S. PATENT DOCUMENTS

| | | | |
|---|---|---|---|
| 6,519,557 B1 * | 2/2003 | Emens et al. ............. | 704/8 |
| 6,826,568 B2 | 11/2004 | Bernstein et al. | |
| 7,200,848 B1 | 4/2007 | Slaughter et al. | |
| 7,353,225 B2 * | 4/2008 | Dada .................. | 707/999.006 |
| 2004/0068498 A1 * | 4/2004 | Patchet et al. .................. | 707/6 |
| 2004/0107243 A1 * | 6/2004 | Tsyganskiy ................ | 709/203 |
| 2004/0194117 A1 | 9/2004 | Schulte et al. | |
| 2004/0239674 A1 | 12/2004 | Ewald et al. | |
| 2004/0267760 A1 | 12/2004 | Brundage et al. | |
| 2005/0235009 A1 | 10/2005 | Purdy et al. | |
| 2006/0004729 A1 | 1/2006 | Zhilyaev et al. | |
| 2006/0085402 A1 * | 4/2006 | Brown et al. .................. | 707/3 |
| 2006/0218160 A1 * | 9/2006 | Bhatia ....................... | 707/100 |
| 2007/0136338 A1 | 6/2007 | Kaler et al. | |
| 2007/0219976 A1 | 9/2007 | Muralidhar et al. | |

OTHER PUBLICATIONS

Wikipedia, "Structural type system", Nov. 2007, 1 page http://en.wikipedia.org/wiki/Structural_type_system.
Madhavan, Jayant, et al., "Generic Schema Matching with Cupid", Proceedings of the 27th VLDB Conference, Roma, Italy, 2001, 10 pages.

(Continued)

*Primary Examiner*—Bai D Vu
(74) *Attorney, Agent, or Firm*—Workman Nydegger

(57) ABSTRACT

Determining compatibility of data structures. A method may be practiced in a computing environment. The method includes accessing a first type defined in a mark-up object. The first type includes a first structure including a first plurality of fields. A second type defined in a mark-up object is accessed. The second type includes a second structure including a second plurality of fields. The first structure and the second structure are compared. Based on the comparison, a determination is made that the first type is compatible with the second type.

20 Claims, 2 Drawing Sheets

OTHER PUBLICATIONS

Thang, Huynh Quyet, et al., "XML Schema Automatic Matching Solution", International Journal of Computer Systems and Engineering vol. 1 No. 1 2007 ISSN 1307-430X, pp. 68-74.
Boβung, Sebastian, "Semi-automatic discovery of mapping rules to match XML Schemas", Nov. 25, 2003, 71 pages.
Office Open XML, Ecma TC45, FInal Draft, Part 5: Markup Compatibility and Extensibility, Oct. 2006, 39 pages.
Bray,Tim, et al., Extensible Markup Language (XML) 1.0 (Fourth Edition), W3C Recommendation Aug. 16, 2006, edited in place Sep. 29, 2006, 37 pages.
Byra, Tim, et al., Namespaces in XML 1.0 (Second Edition), W3C Recommendation Aug. 16, 2006, 9 pages.
Berners-Lee, T., et al., Uniform Resource Identifier (URI): Generic Syntax, Jan. 2005, 61 pages.

* cited by examiner

DATA DESCRIPTION LANGUAGE FOR RECORD BASED SYSTEMS

BACKGROUND

Background and Relevant Art

Computers and computing systems have affected nearly every aspect of modern living. Computers are generally involved in work, recreation, healthcare, transportation, entertainment, household management, etc.

Data for use by computer systems can be stored and represented in a number of different ways. For example, data in databases is stored in the form of records. A record in the database typically includes a number of fields. Each field is generally limited to a single entry including a name and value. For example, a database may store records of customers for a business. Each record may include a name field, an address field, and a credit card number field. Only a single value may be entered into any one of the given named fields. Notably, a record field may itself be another record or an atom. An atom is a value which has no structure from the perspective of the type system or runtime.

In another alternative, data may be stored in a markup data structure such as an extensible markup language (XML) data structure. XML data structures are very flexible in their definition. Illustratively, XML data structures may define data objects in terms of elements, attributes or a combination of elements and attributes. An example of an XML data structure defining data in terms of attributes is as follows:

<Person name="Bob" age="39"/>

An example of an XML data structure defining data in terms of elements is as follows:

```
<Person>
    <Name> Bob </Name>
    <Age>39 </Age>
</Person>
```

Examples may be further implemented which combine attribute and element representations.

However, this flexibility requires accessible definitions to be defined for a given XML data structure. Illustratively, an XML schema defines how data in a particular XML data structure should be interpreted. The XML schema can then be stored in a centralized location such that computer systems receiving data formatted according to the particular schema can access the schema to determine how the data should be interpreted. XML data is not necessarily constrained to a single value for a given field as with database record data. Rather, XML data can include elements with multiple entries for a given element. However, XML data can also be used to represent database records. In particular, XML data may include attributes where attribute includes a name value pair. When large amounts of flexibility are desired for representations of XML data, such as when there is a desire to mix elements and attributes in a given XML data structure, the number of required schemas to define how the data should be interpreted may increase exponentially.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment disclosed herein includes a method of determining compatibility of data structures. The method may be practiced in a computing environment. The method includes accessing a first type defined in a mark-up object. The first type includes a first structure including a first plurality of fields. A second type defined in a mark-up object is accessed. The second type includes a second structure including a second plurality of fields. The first structure and the second structure are compared. Based on the comparison, a determination is made that the first type is compatible with the second type.

Another embodiment includes a method for defining a type. The method includes defining a name for a first type. The method further includes defining a first structure including a first plurality of fields in the first type. Defining a first structure includes appending fields from a second type external to the first type as part of the structure of the first type.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
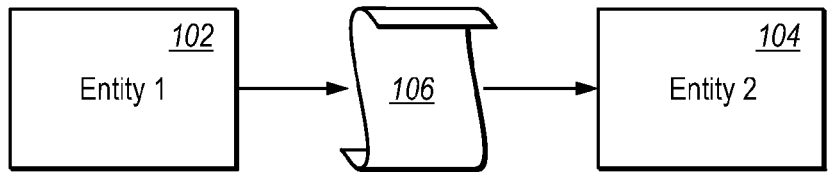
FIG. 1 illustrates communication of a type from one entity to another entity.

Some embodiments described herein are directed to methods for allowing data to be represented in a way that is independent of a given system or runtime. For example, some embodiments include a schema language for describing values that conform to languages such as the XAML (Extensible Application Markup Language) data model. Such values may be found in text files, typed objects in runtime system or virtual machine, or as data structures that can be interpreted according to the XAML data model. In some embodiments, the schema language includes functionality for defining types. Types are named constructs that describe either records or atoms or combinations of records and atoms.

Type definitions in the schema language are named and thus the schema language can be interpreted as a nominal type system, where type affiliation and type compatibility are determined on the basis of type names. However, the schema language can also be interpreted as a structural type system, where type affiliation and type compatibility are determined on the basis of structural matching, as described in more detail later herein.

Some embodiments may also include the ability to describe types that provide properties that can be attached to other types. In other words, a first type may be augmented with another type so as to be able to add additional properties to the first type. This may be particularly useful for augmenting a closed type with additional properties. As illustrated below, a type may include an IsSealed property definition which prevents additional fields from being added to the type. However, the type may be augmented with another type to add additional fields. Further, such attached members may be used to augment the data description language itself.

Some embodiments allow for the separation of the notions of identity, referencability, and nullability. In particular, for identity and referencability, embodiments allow for type definitions to include properties specifying whether identity for a type is preserved. For nullability, embodiments may include properties specifying if a value may be represented by a null construct.

Some embodiments may be used for a number of different purposes including but not limited to one or more of the following:

Creating in-memory structures based on a schema language type definition.

System independent type information—the schema language type descriptions may describe values in non-XAML based systems (e.g., file formats, stores, messaging systems) that have a pre-defined XAML interpretation.

Post-facto annotation of "native" objects and types within a virtual machine. The schema language description of a native Java or CLR type can add additional information about the type that is not present in the native metadata.

Validating in-memory structures. An in-memory data structure can be validated against a schema language description using either nominal or structural typing.

Validating XAML markup. A XAML instance document can be validated against a schema language description. This validation could occur dynamically as the instance document is created or could be run against an existing instance document.

Providing programming language auto-completion features.

Referring now to FIG. 1, an example is illustrated showing data exchange from one entity 102 to a second entity 104. The entities 102 and 104 may be any one of a number of different data providers and consumers. The data is exchanged in the form of a type data structure 106 conforming to the schema language data model. Notably, the schema language data model allows the message 106 to be expressed in a fashion that is independent of a given type system or runtime at the entities 102 and 104. In the example shown, entity 104 may include functionality for determining that the type data structure 106 is compatible with data structures that can be consumed by the entity 104.

Figure 2A:
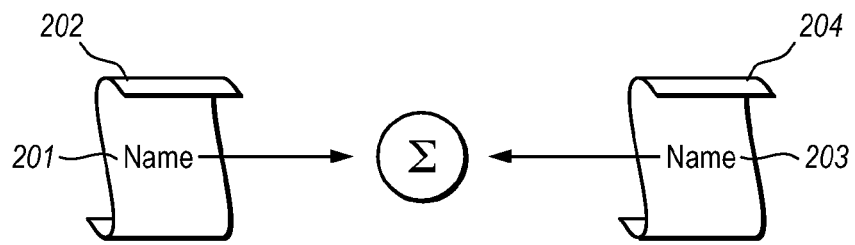
FIG. 2A illustrates nominal type compatibility comparisons.
Figure 2B:
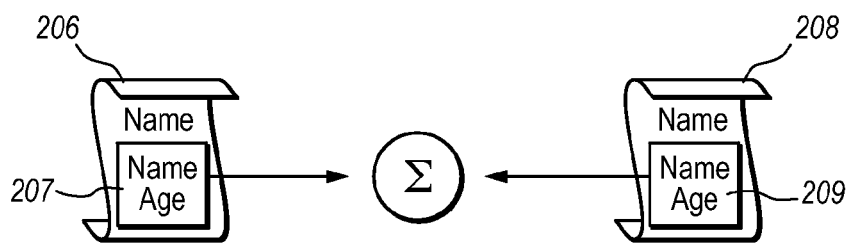
FIG. 2B illustrates structural type compatibility comparisons.
Figure 2C:
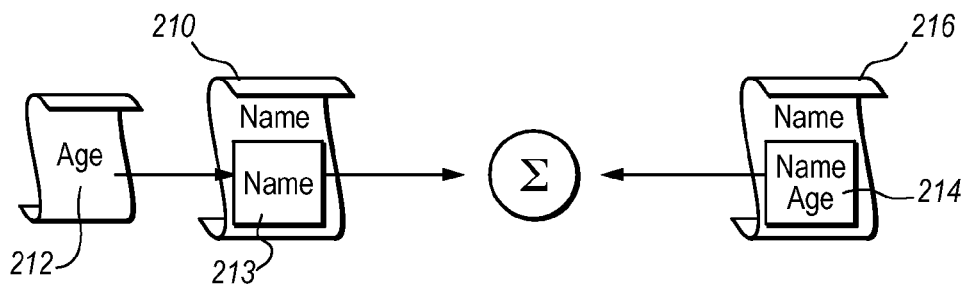
FIG. 2C illustrates another example of structural type compatibility comparisons.

In particular, FIGS. 2A, 2B and 2C illustrate a number of examples where comparisons take place to determine compatibility. As will be discussed in more detail further herein, FIG. 2A illustrates where type data structures are compared nominally to determine if the names of the type data structure match. For example, the name 201 of the type data structure 202 is compared to the name 203 of the type data structure 204. This comparison can result in a determination that type data structures 202 and 204 are compatible.

FIG. 2B illustrates an example where type data structures 206 and 208 are compared structurally. By comparing the structure of the two data structures 206 and 208 as illustrated in FIG. 2B, a determination can be made as to whether the data structures 206 and 208 are compatible. In the example illustrated in FIG. 2B, the structure 207 for the type data structure 206 is compared to the structure 209 of the type data structure 208. The structures may be defined based on fields included in the type data structures. FIG. 2C illustrates yet another example where structural comparisons are made. However in the example illustrated in FIG. 2C, a type data structure 210 may include one or more fields from an external type data structure 212 which becomes part of the data structure 213 of the type data structure 210 for purposes of comparison to determine compatibility. Comparison can then be made by comparing the structure 210, including fields or elements from the type data structure 212 to a structure 214 of a type data structure 216 to determine compatibility of type data structure 210 and type data structure 216. Each of these examples will be discussed in more detail below.

The following discussion now illustrates one example of how a schema language may be implemented including concepts of the schema language and rules applied to elements of the schema language. Those of skill in the art will appreciate that other embodiments not strictly conforming to the examples now illustrated may be implemented within the scope of the invention.

An important concept of the present example of a schema language data model is the notion of values. Values are either records or atoms. Records are a collection of name/value pairs. Atoms are unstructured data from the perspective of the schema language. At the lowest level, the only atom is string. However, additional atoms can be defined by specifying a format for the textual form of that atom.

As alluded to previously, type declarations are used in the schema language. They are named constructs that describe either records or atoms. Atoms are types whose structure is opaque to the schema language type system. Types that describe atoms do not define any members. Such types reference a syntax that describes the textual form of instances of the type.

Records are structured types. Types that describe records do so by declaring zero or more members. Members have a name and a type and are unordered. Types that describe records may reference a syntax that describes a textual form of instances of the type.

Types can derive from other types. The schema language supports the notion of primary and additional base types. Derived types have all the members of their base types and any additional members defined by the type itself. If no explicit primary base type is specified then the type is derived from a built-in schema language type called "root", which defines no members and references no syntax.

Types that describe records can declare themselves as parameterized by declaring one or more type parameters. Those type parameters can then be referenced, by name, via a type reference, in member declarations and/or references to base types. Types that describe atoms are not parameterized.

The following table shows how type definitions are classified as atoms or records depending on whether they define members and whether they reference a syntax. The Syntax construct is used to describe a textual representation that can then be associated with a Type or a Property. Such textual representation can be specified using point-wise values in the lexical space or using a regular expression to describe sets of values in the lexical space. The Syntax construct will be described in more detail below.

| Define Members? | Reference A Syntax | Classification |
|---|---|---|
| No | Yes | Atom |
| Yes | No | Record |
| Yes | Yes | Record |
| No | No | Record |

Member definitions and base type specifications refer to other types. They do so using a type reference. When referencing a non-parameterized type the type reference is merely the name of the type being referred to. When referring to a parameterized type, the type reference can provide type arguments that are substituted for the type parameters in the parameterized type definition. Such substitution is positional. Thus a type reference to a parameterized type may refer to the parameterized type declaration itself, in which case it does not specify any type arguments, or it may refer to a more specific type, in which case it specifies one or more type arguments. Within the definition of a parameterized type, the names of type parameters may be used as type references by using the name of the type parameter where the name of a type would usually appear. If the name in a type reference within a parameterized type definition matches the name of a type parameter defined by that type definition then the type reference is a reference to that type parameter, regardless of whether there is an actual type with that name. Note that in the particular example illustrated, the schema language does not define how the set of types against which type references are resolved is constructed.

Type compatibility is an important concept to allow for representation of data independent from a given system or runtime. Type compatibility has been illustrated briefly above and will be discussed in more detail below. However, to facilitate clearer understanding of compatibility determination examples, a description of rules and definitions of the example schema language are now set forth.

Type definitions for records in the schema language may declare named members, in the form of properties, methods or events. Properties are named values that are affiliated with instances of the declaring type. Property declarations specify the expected type of the property's value. Methods are named operations that are affiliated with instances of the declaring type. Method declarations specify the expected type of parameters, if any, along with the expected type of any result. The body of a method may also be specified using constructs defined outside the core the schema language specification. Events are named notifications that may be raised by instances of the declaring type. Event declarations may specify the expected signature of the notification method.

A type can specify whether instances of the type have meaningful identity semantics. For example, as will be discussed in further detail below, a type can specify a value for an IsByValue property. For types that specify IsByValue as true (i.e. value types), identity is not preserved for multi-referenced instances. For types that specify IsByValue as false (i.e. reference types), identity is preserved for multi-referenced instances.

A type can specify whether the value represented by the <x:Null/> construct (called "null" hereinafter) is part of its value space. The example schema language defines an IsNullable property. For types that specify IsNullable as false, null is not in their value space. For convenience, the schema language may define a parameterized type, Nullable, that can be referred to in a type reference to specify a version of non-nullable type for which null is a value in the value space. A type referenced by the type parameter to Nullable should have a value of false for its IsNullable property.

A type can specify that it is a collection. The example schema language defines three parameterized types; UnorderedList, OrderedList and Dictionary. UnorderedList is an unordered collection that defines two methods; Add and GetEnumerator. Any type which defines such methods is considered to be compatible with the UnorderedList type. OrderedList is an ordered collection that defines three methods; Add, Insert and GetEnumerator. Any type which defines such methods is considered to be compatible with the OrderedList type. Dictionary is a collection of keys and values and provides a mapping from the former to the latter. Dictionary defines three methods; Add, TryGetValue and GetEnumerator. Any type which defines such methods is considered to be compatible with the Dictionary type.

This section describes constructs and their properties in the example schema language as named collections of properties, where a property has a name and a type. Where the type of the property is a collection, the property is empty by default unless otherwise stated.

The Type construct is used to describe values that conform to the data model described above. Types are named and define a scope for a set of named member declarations. Types may be defined inside a schema. Types can name other types as base types, in which case the resulting type has all the members of the base types and any members it declares. Types may have one or more of the following properties:

Name—The name of the type, which is a tuple comprised of a namespace name and local name. In the example illustrated this is a required property. While it is possible to define a type whose namespace name is the empty string, definition of such types is discouraged.

Parameters—A, possibly empty, ordered collection of TypeParameter instances. If this collection is non-empty then the type is a parameterized type. TypeParameters in a given parameters collection have different values for their Name properties. No two Type definitions have the same value for their Name property and the same number of TypeParameters in their Parameters property. If a type defines no members and references a syntax (i.e. is an atom), then the Parameters property is empty.

Members—A, possibly empty, unordered collection of Member instances. All Members in a given Members collection have different values for their Name properties.

AttachableMembers—A, possibly empty, unordered collection of AttachableMemberGroup instances. AttachableMemberGroups are used to define attached members, that is, members that a type defines that can be attached to instances of other types. An example of attaching members is illustrated in FIG. 2C, where elements of the type 212 can be attached to the structure 213 of type 210.

BaseType—A TypeReference referring to a Type that the referring type derives from. Instances of the derived type have all the Members of their base type in addition to any members the derived type defines. Also, certain property values, if specified by the base type, are inherited by the derived type. The default value of this property is Root, the root of the example schema language type system, which defines no members. The BaseType property of a type does not reference that type directly or transitively.

Interfaces—A, possibly empty, unordered collection of TypeReferences referring to Types the referring type derives from in addition to that specified by the BaseType property. Instances of the derived type have all the Members of all the types referenced by the members of this collection, in addition to any specified by the type itself and any inherited from the Type referred to by BaseType. Note that the aspects of a type are not inherited by the derived type when the base type appears in the Interfaces collection. The Interfaces collection of a given type do not contain a TypeReference that refers to the type reference referred to by the BaseType property, if any. All TypeReferences in a given Interfaces collection are unique. That is they refer to different types, or, in the case of references to parameterized types, specify different type arguments.

ContentPropertyName—A String, denoting the name of a property which is the content property for values of this type. If no value for this property is specified on a type then the type inherits the value specified on the type referenced by the BaseType property, if any. This property has no default value. The value of the ContentPropertyName property matches the Symbol production. The value of the ContentPropertyName property matches the name of a Property defined by the Type or inherited from its BaseType, transitively.

RuntimeNameProperty—A String, denoting the name of a property which is the name property for values of this type. If no value for this property is specified on a type then the type inherits the value specified on the type referenced by the BaseType property, if any. This property has no default value. The value of the RuntimeNameProperty property matches the Symbol production. The value of the RuntimeNameProperty property matches the name of a Property defined by the Type or inherited from its BaseType, transitively.

ContentWrapperTypes—A collection of type references specifying types that can be used to wrap content which would not ordinarily be allowed in a given collection. In the example illustrated, this property can only be specified if UnorderedList, OrderedList or Dictionary appears in the BaseType or Interfaces properties of the type, transitively. The value of this property is the type references specified by the type, and the type references specified by the type referenced by the BaseType property, if any.

IsAbstract—A Boolean. If this property has a value of true then concrete instances of the type cannot appear in instances of the data model. If this property has a value of false then concrete instances of the type can appear in instances of the data model. This property has a default value of false.

IsSealed—A Boolean. If this property has a value of true then the type cannot be referenced in the BaseType or Interfaces properties of any type. In addition, only those properties specified by the type definition are allowed in to appear in instances of the type. If this property has a value of false then the type can be referenced in the BaseType or Interfaces properties of any type and additional properties over and above those specified by the type definition are allowed to appear in instances of the type. This property has a default value of false. With respect to properties, only non-attached members are affected by the value of IsSealed. In the embodiment illustrated, attached members are always allowed even is IsSealed has a value of true.

IsByValue—A Boolean. If this property has a value of true, then the type is a value type as discussed previously. If this property has a value of false, then the type is a reference type and discussed previously. This property has a default value of false. If the type referenced by the BaseType specifies a value of true for IsByValue then the derived type cannot specify a value of false for IsByValue.

IsNullable—A Boolean. If this property is set to true, then null is part of the value space of the type. If this property is set to false, then null is not part of the value space of the type. This property has a default value of true.

IsNameScope—A Boolean. If this property has a value of true, then names, that is x:Name[XAML] properties or properties corresponding to the RuntimeNameProperty, occurring in the scope of values of the type are NOT visible outside the value and therefore cannot be the target of an x:Reference [XAML] that appears outside the value. If this property has a value of false, then names, that is x:Name[XAML] properties or properties corresponding to the RuntimeNameProperty, occurring in the scope of values of the type are visible outside the value and therefore can be the target of an x:Reference [XAML] that appears outside the value. This property has a default value of false. If the type referenced by the BaseType specifies a value of true for IsNameScope then the derived type cannot specify a value of false for IsNameScope.

Syntax—A SyntaxReference referring to a Syntax definition. The textual form of instances of the type conforms to the definition provided by the specified Syntax. If no value for this property is specified on a type then the type inherits the value specified on the type referenced by the BaseType property, if any. This property has no default value.

Another construct is a TypeParameter construct. The TypeParameter construct is used to model parameters to parameterized types. The TypeParameter construct may have one or more of the following properties:

Name—The name of the type parameter, which is a tuple comprised of a namespace name and local name. This name can be used in the TypeName property of zero or more TypeReferences, indicating that each such TypeReference will need to specify arguments before the defining type can be fully interpreted. This property is required.

Another construct is a TypeReference construct. The TypeReference construct is used to reference a Type. A TypeReference has TypeName and Arguments properties, the latter being a, possibly empty, list of TypeReferences used to close a parameterized type. A given type reference refers to the Type whose Name property matches TypeName property of the TypeReference and whose number of TypeParameters matches the number of TypeArguments specified by the TypeReference. The TypeReference construct may have one or more of the following properties:

TypeName—The namespace name, local name pair of the type being referred to. This property is required.

Arguments—A, possibly empty, ordered collection of TypeReferences. This collection is used when referring to parameterized types to specify the type arguments to such types. Each TypeReference in this collection provides the type to be substituted for the TypeParameter at the same ordinal position in the Parameters property of the type definition referred to by the TypeName property.

Another construct is a Member construct. The Member construct is used to describe a member of a type; that is a property, method or event. As discussed above, the example schema language defines three kinds of members: Properties, Methods and Events. The Member construct may have one or more of the following properties:

Name—The name of the member. This property is required. The value of the Name property matches the Symbol production. The Name is scoped by the declaring Type.

IsStatic—A Boolean indicating whether the member is a static or instance member. If this property has a value of true, then the member is a static member and all instances share a single member, otherwise, the member is an instance member and each instance has its own. This property has a default value of false.

Another construct is a Property construct. The Property construct has Member as its base type and is used to describe a property of a type. The Property construct may have one or more of the following properties:

Type—A TypeReference for the Type of the Property. This property is required.

IsByValue—A Boolean indicating whether the property is by value. If this property has a value of true then the type of the value of the property a value type. This property has no default value. This property cannot be specified with a value of false. This property can only have a value of true if the Type referred to by the Type property of the Property is a reference type.

IsRequired—A Boolean. If this property has a value of true then the property is a required property and as such appears in any instances of the defining type. If this property has a value of false, then the property is an optional property and as such may be omitted in instances of the defining type. This property has a default value of false.

DefaultValue—A value whose type is the same as the type of the property on which the DefaultValue property appears. The value of this property denotes the default value for the property on which the DefaultValue property appears. This property has no default value.

Syntax—A reference to a Syntax for the defining property. Values for the defining property matches the Syntax referred to by this property, rather than any Syntax referred to by the type referenced by the Type property.

Another construct is a Method construct. The Method construct has Member as its base type and is used to describe a method of a type. The Method construct may have a Signature property. This property is the signature of the method; i.e. the return type and parameters.

Another construct is an Event construct. The Event construct has Member as its base type and is used to describe a named notification that may be raised by instances of the declaring type. The Event construct may have a Signature property. This property is the signature of the method; i.e. the return type and parameters.

Another construct is a Signature construct. The Signature construct is used to model the return type and parameters of method and event signatures. The Signature construct may have one or more of the following properties:

ReturnType—A TypeReference to the type of value returned by the method or event. This property is optional. If this property is not specified the signature indicates no return value.

Parameters—A, possibly empty, ordered collection of SignatureParameter instances.

Another construct is a SignatureParameter construct. The SignatureParameter construct is used to model a parameter to a method or event signature. The SignatureParameter construct may have one or more of the following properties:

Name—The Name of the SignatureParameter. This property is required. The value of the Name property matches the Symbol production.

Type—A TypeReference to the type of the SignatureParameter. This property is required.

Direction—An atomic type whose allowable values are In and/or Out. Syntactically, In and Out are allowed values and can be combined, separated by a space. If the value of this property is In then the parameter value is passed from the caller to the callee. If the value of this property is Out then the parameter value is passed from the callee to the caller. If both values are specified then the parameter value is passed from the caller to the callee and back. This property has a default value of In.

Another construct is an AttachableMemberGroup construct. The AttachableMemberGroup construct is used to describe a set of properties that can be attached to some target type. The AttachableMemberGroup construct may have one or more of the following properties:

TargetType—A TypeReference for the Type that members defined in this AttachableMemberGroup can be attached to. This property has a default value of Root.

Members—An unordered list of Members. The members defined in this property can appear as attached members on instances of the type specified in the TargetType property.

Another construct is a Syntax construct. The Syntax construct is used to describe a textual representation that can then be associated with a Type or a Property. Such textual representation can be specified using point-wise values in the lexical space (see the Value construct described above) or using a regular expression to describes sets of values in the lexical space (see the ValuePattern construct described below). The Syntax construct may have one or more of the following properties:

Name—The name of the syntax, which is a tuple comprised of a namespace name and local name. This property is required.

AllowMultiple—A Boolean. If this property has a value of true then the textual form may contain multiple occurrences of values specified by the syntax definition. If this property has a value of false then the textual form does not contain multiple occurrences of values specified by the syntax definitions. The delimiter used between each value is specified using the Separator property described below. This property is optional. This property has a default value of false.

CaseSensitive—A Boolean. If this property has a value of true, then the values specified by the syntax are considered to be case-sensitive and textual forms match the casing specified by the values. If this property has a value of false, then the values specified by the syntax are considered to be case-insensitive and textual forms may use any mixture of casing. This property is optional. This property has a default value of false.

Separator—A character. If AllowMultiple has a value of true then this property indicates which character denotes the separator between one value and another. This property is optional. The default value of this property is space (Unicode 0x20)

Normalize—A Boolean. If this property has a value of true, then the textual values are processed according to the defining Syntax are subject to whitespace normalization before determining whether such instances do in fact conform to the defining Syntax. This property is optional. This property has a default value of false.

Values—An unordered collection of ValueBase instances. The textual representation is made up of the union of all the specified values.

Another construct is a SyntaxReference construct. The SyntaxReference construct is used to refer to a Syntax. The SyntaxReference construct has a Syntax property which defines the local name and namespace of the syntax being referred to. This is a required property.

Another construct is a ValueBase construct. The ValueBase construct serves as the common base type for Value and ValuePattern. It defines no properties of its own.

Another construct is a Value construct. The Value construct is used to specify a textual value allowed by the declaring syntax. The Value construct includes a Value property. The Value property is a string denoting a value allowed by the declaring Syntax. This property is a required property.

Another construct is a ValuePattern construct. ValuePattern is used to describe a set of allowable values for a Syntax. The ValuePattern construct includes a Pattern property. The pattern property is a string denoting a regular expression which denotes values allowed by the declaring Syntax. This property is required.

Another construct is a Schema construct. The Schema construct is a container for Type and Syntax definitions. In general, the example schema language type may appear in any XAML document/vocabulary. The example schema language defines the Schema construct as a useful but optional container element for use in cases where multiple Types and/or Syntaxes are being defined together. The Schema construct may have one or more of the following properties:

Types—A, possibly empty, unordered collection of Type definitions.

Syntaxes—A, possibly empty, unordered collection of Syntax definitions.

The example schema language set forth above is only one example, and those of skill in the art will recognize that other embodiments may be implemented with different features. The schema language supports two forms of type compatibility. As types in the schema language have names, type compatibility can be determined nominally. Type compatibility for atoms is nominal. For record types, type names can be ignored and type compatibility can be determined structurally.

Nominal Type Compatibility

As illustrated in FIG. 2A, compatibility of types can be determined by referencing the names of the types. A number of different criteria may be defined for determining if two types are nominally compatible. The following represent a number of criteria that may be used in some embodiments to determining nominal compatibility:

Non-parameterized types T1 and T2 are nominally compatible if their Name properties are equal.

Non-parameterized types T1 and T2 are nominally compatible if a reference to type T2 appears in the set of base types for T1, transitively.

Parameterized types T1 and T2 are nominally compatible if their Name properties are equal and the types of their type arguments are compatible.

Value V with type affiliation T1 can appear where a value of type T2 is expected provided T1 and T2 are compatible.

Structural Type Compatibility

Types may be compared to determine if they are structurally compatible. FIGS. 2B and 2C illustrate examples where comparisons are made based on the structure of types to determine if the types are compatible. In one embodiment, types may be compared structurally using a member by member comparison. A number of comparisons for structural type compatibility are illustrated below.

A type T1 is said to be structurally compatible with a type T2 if for each member, e.g. each property, method or event, declared by T1, T2 declares a member with the same name and a compatible type, and T1 and T2 have the same values defining their nullability, identity and referenceability. For example, in the language illustrated above, defining nullability, identity and referenceability can be done using the IsNullable and IsByValue properties.

A value V is said to be structurally compatible with a type T that specifies a value of false for a property that defines a type as sealed, such as the IsSealed property described above, if for each member declared by T, V has a member with a matching name and a compatible type.

A value V is said to be structurally compatible with a type T that specifies a value of true for IsSealed if for each member declared by T, V has a member with a matching name and a compatible type and V has no additional members beyond those defined by T.

Given two types, T1 and T2, which are structurally compatible apart from the fact that T1 specifies a value of true for a property such as IsByValue while T2 specifies a value of false for a property such as IsByValue, the type of a property that specifies type T2 and a value of true for a property such as IsByValue is structurally compatible with T1.

Given two types, T1 and T2, which differ only in that T1 specifies a value of true for a property such as IsNullable while T2 specifies a value of false for a property such as IsNullable, Nullable (T2) is structurally compatible with T1.

Embodiments may be implemented where structural compatibility is defined by the existence of certain members even when additional members may exist in one of the types. For example, Dictionary defines three methods; Add, TryGetValue and GetEnumerator. Any type which defines such methods is considered to be compatible with the Dictionary type irrespective of whether or not other members are defined in the type.

Figure 3:
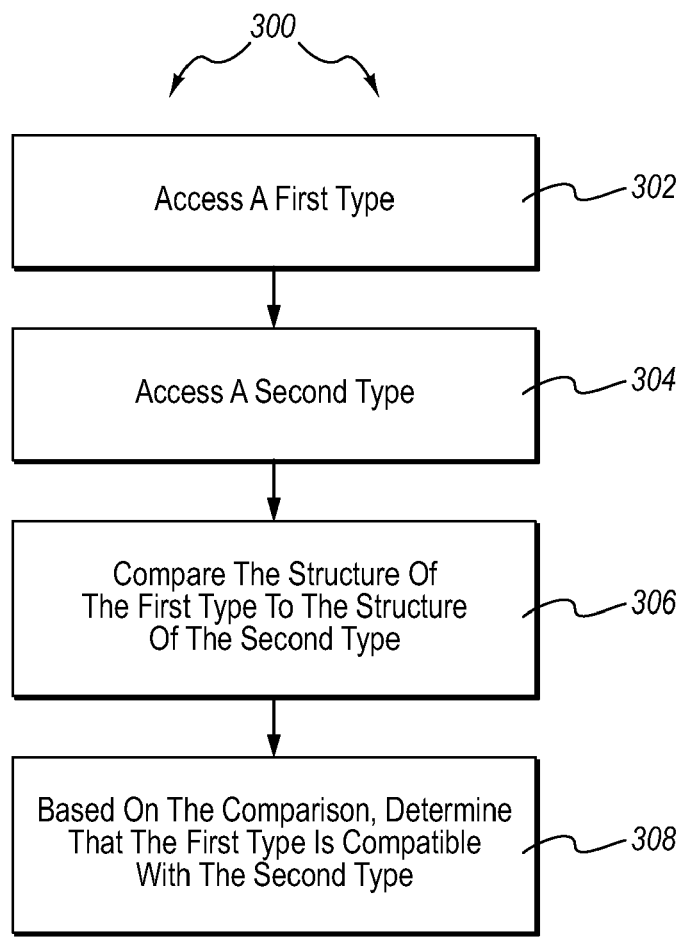
FIG. 3 illustrates a method of determining compatibility of types.

Referring now to FIG. 3, a method 300 is illustrated. The method 300 includes acts for determining compatibility of data structures. The method 300 includes accessing a first type defined in a mark-up object (act 302). The first type includes a first structure including a first plurality of fields. An example of act 302 is illustrated in FIG. 2B, where a type 206 including a structure 207 is accessed.

The method 300 further includes accessing a second type defined in a mark-up object (act 304). The second type includes a second structure including a second plurality of fields. An example of act 304 is illustrated in FIG. 2B where a type 208 including a structure 209 is accessed.

The first structure of the first plurality of fields is compared to the second structure of the second plurality of fields (act 306). A determination that the first type is compatible with the second type is made based on the comparison (act 308).

Figure 4:
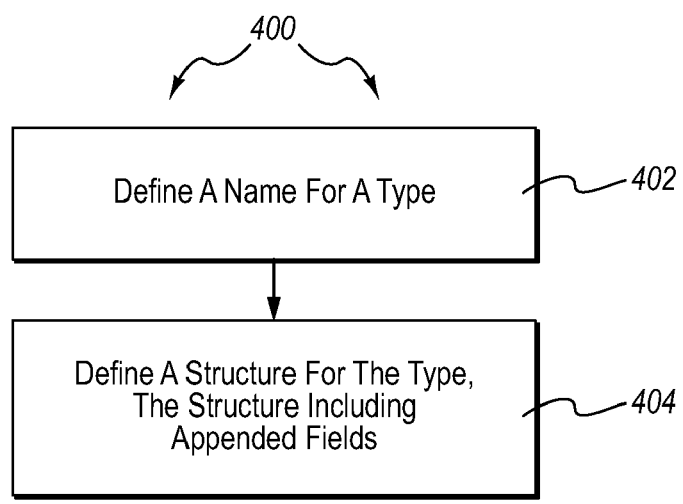
FIG. 4 illustrates a method of generating a type.

Referring now to FIG. 4, a method of defining a type is illustrated. The method includes defining a name for a first type (act 402). The method 400 further includes defining a first structure including a first plurality of fields in the first type. Defining a first structure includes appending or attaching fields from a second type external to the first type as part of the structure of the first type.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise either computer storage media or communication media. Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. Communication media includes signals and carrier waves. For example, when information is transferred or provided over a network or another communications connection (either hardwired, wireless, or a combination of hardwired or wireless) to a computer, the computer properly views the connection as a communication medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment, a method of determining compatibility of typed data structures that conform to the Extensible Application markup Language (XAML), the method comprising:
    accessing a first typed data structure defined in a mark-up object of a first type, the first typed data structure comprising a first plurality of fields, wherein each of the first plurality of fields defines a member of the first type consisting of one of a property, a method, or an event of the first type, wherein each member has a name and a type;
    accessing a second typed data structure defined in a mark-up object of a second type, the second typed data structure comprising a second plurality of fields, wherein each of the second plurality of fields defines a member of the second type consisting of one of a property, a method, or an event of the second type, wherein each member has a name and a type;
    comparing the first typed data structure to the second typed data structure to determine if the first and second types are compatible, wherein the comparison is performed by comparing the members of the first typed data structure to the members of the second typed data structure; and
    determining based on the comparison that the first type is compatible with the second type if for each member in the first typed data structure, there is a member in the second typed data structure that has the same name and a compatible type.

2. The method of claim 1, wherein at least one of the first type or the second type is a description comprising an instantiation of a type.

3. The method of claim 1, wherein at least one of the first or second plurality of fields comprises at least one of an element or an attribute.

4. The method of claim 1, wherein at least one of the first or second plurality of fields comprises both an element and an attribute.

5. The method of claim 1, wherein at least one of the first or second plurality of fields comprises a property identifying the first or second type as a value type such that identity is not preserved for multi-referenced instances.

6. The method of claim 1, wherein at least one of the first or second plurality of fields comprises a property identifying the first or second type as a reference type such that identity is preserved for multi-referenced instances.

7. The method of claim 1, wherein at least one of the first or second plurality of fields comprises a property identifying the first or second type as nullable by specifying a value may be represented by a null construct.

8. The method of claim 1, wherein comparing the first typed data structure to the second typed data structure comprises comparing fields appended to the first typed data structure from a type external to the first typed data structure, to the second typed data structure.

9. The method of claim 1, further comprising, nominally determining compatibility of the first and second typed data structures by comparing a name of the first typed data structure to a name of the second typed data structure.

10. The method of claim 1, wherein determining based on the comparison that the first type is compatible with the second type comprises determining that an in-memory structure conforms to a particular description.

11. The method of claim 1, wherein determining based on the comparison that the first type is compatible with the second type comprises determining that a serialized form conforms to a particular description.

12. The method of claim 1, wherein comparing the first typed data structure to the second typed data structure to determine if the first and second types are compatible further comprises:
    determining that the first and second typed data structures each have the same values defining the nullability, identity and referenceability of their respective type.

13. The method of claim 1, wherein determining based on the comparison that the first type is compatible with the second type further comprises determining that the second type is a closed type preventing additional fields from being added to the second typed data structure and determining that the second typed data structure has no additional members beyond those defined in the first typed data structure.

14. The method of claim 1, wherein determining based on the comparison that the first type is compatible with the second type comprises determining that the first type and the second type, which differ only in that the first typed data structure specifies a value of true for a nullability property while the second typed data structure specifies a value of false for a nullability property, are structurally compatible when the second type is nullable.

15. In a computing environment, a computer storage medium storing computer executable instructions that when executed by a processor cause the following acts to be performed:
    accessing a first typed data structure defined in a mark-up object of a first type, the first typed data structure comprising a first plurality of fields, wherein each of the first plurality of fields defines a member of the first type consisting of one of a property, a method, or an event of the first type, wherein each member has a name and a type;
    accessing a second typed data structure defined in a mark-up object of a second type, the second typed data structure comprising a second plurality of fields, wherein each of the second plurality of fields defines a member of the second type consisting of one of a property, a method, or an event of the second type, wherein each member has a name and a type;

comparing the first typed data structure to the second typed data structure to determine if the first and second types are compatible, wherein the comparison is performed by comparing the members of the first typed data structure to the members of the second typed data structure; and determining based on the comparison that the first type is compatible with the second type if for each member in the first typed data structure, there is a member in the second typed data structure that has the same name and a compatible type.

16. The computer storage medium of claim 15, wherein comparing the first typed data structure to the second typed data structure to determine if the first and second types are compatible further comprises:

determining that the first and second typed data structures each have the same values defining the nullability, identity and referenceability of their respective type.

17. The computer storage medium of claim 15, wherein determining based on the comparison that the first type is compatible with the second type further comprises determining that the second type is a closed type preventing additional fields from being added to the second typed data structure and determining that the second typed data structure has no additional members beyond those defined in the first typed data structure.

18. The computer storage medium of claim 15, wherein determining based on the comparison that the first type is compatible with the second type comprises determining that the first type and the second type, which differ only in that the first typed data structure specifies a value of true for a nullability property while the second typed data structure specifies a value of false for a nullability property, are structurally compatible when the second type is nullable.

19. The computer storage medium of claim 15, wherein at least one of the first type or the second type is a description comprising an instantiation of a type.

20. The computer storage medium of claim 15, wherein at least one of the first or second plurality of fields comprises a property identifying the first or second type as nullable by specifying a value may be represented by a null construct.

* * * * *